(12) United States Patent
Osborn et al.

(10) Patent No.: US 6,738,931 B1
(45) Date of Patent: May 18, 2004

(54) RELIABILITY ASSESSMENT METHOD, APPARATUS AND SYSTEM FOR QUALITY CONTROL

(75) Inventors: Brock Estel Osborn, Niskayuna, NY (US); Christopher Leon Stanard, Niskayuna, NY (US); David Mark Handkins, Cincinnati, OH (US); John Erik Hershey, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 569 days.

(21) Appl. No.: 09/705,294

(22) Filed: Nov. 3, 2000

(51) Int. Cl.$^7$ .................................................. G06F 11/00
(52) U.S. Cl. ............................................ 714/37; 714/25
(58) Field of Search ............................ 714/37, 25, 27, 714/47; 709/214; 701/35, 29

(56) References Cited

U.S. PATENT DOCUMENTS

| | | | | |
|---|---|---|---|---|
| 4,404,639 A | * | 9/1983 | McGuire et al. ............... 701/35 |
| 5,608,845 A | | 3/1997 | Ohtsuka et al. ............... 395/50 |
| 5,657,245 A | | 8/1997 | Hecht et al. ................. 364/505 |
| 5,835,886 A | | 11/1998 | Scheil ........................ 702/179 |
| 6,138,249 A | * | 10/2000 | Nolet ......................... 714/25 |
| 6,181,994 B1 | * | 1/2001 | Colson et al. ................ 701/33 |
| 6,247,145 B1 | * | 6/2001 | Witteried .................... 714/33 |
| 6,308,120 B1 | * | 10/2001 | Good ......................... 701/29 |
| 6,347,384 B1 | * | 2/2002 | Satomi et al. ................ 714/57 |
| 6,438,471 B1 | * | 8/2002 | Katagishi et al. ............. 701/33 |
| 6,442,460 B1 | * | 8/2002 | Larson et al. ................ 701/33 |
| 6,556,904 B1 | * | 4/2003 | Larson et al. ................ 701/33 |
| 2002/0046369 A1 | * | 4/2002 | Satomi et al. ................ 714/47 |
| 2003/0105829 A1 | * | 6/2003 | Hayward .................... 709/214 |

* cited by examiner

*Primary Examiner*—Robert Beausoliel
*Assistant Examiner*—Marc Duncan
(74) *Attorney, Agent, or Firm*—David C. Goldman; Patrick K. Patnode

(57) ABSTRACT

A reliability assessment analysis system. Included as part of system are a plurality of analysis stations, at least one of the analysis stations being located at a remote geographic location from others, and each of the analysis stations being capable of performing reliability assessment analysis processes on components or systems of components. Further provided is a plurality of database sites, where at least one of the database sites is located at a remote geographic location from the others. Each database site includes a database of data, at least some of the data being usable by at least one of the analysis stations. A communications infrastructure provides a communication path between and among the plurality of analysis stations and the plurality of database sites. The analysis stations and database sites are configured to provide a user of at least one of the analysis stations with access to more than a single one of the database sites. The analysis stations and the database sites are further configured to update data stored on the database sites when newly updated data is entered into the system.

17 Claims, 13 Drawing Sheets

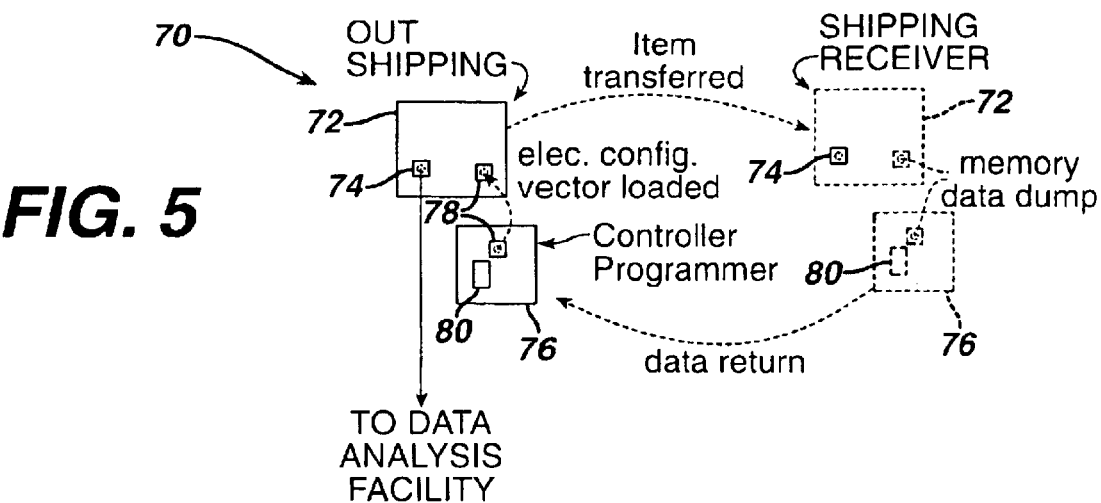
FIG. 5
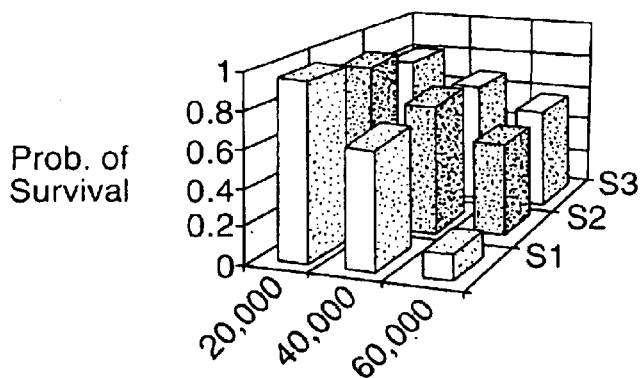
FIG. 6
FIG. 7
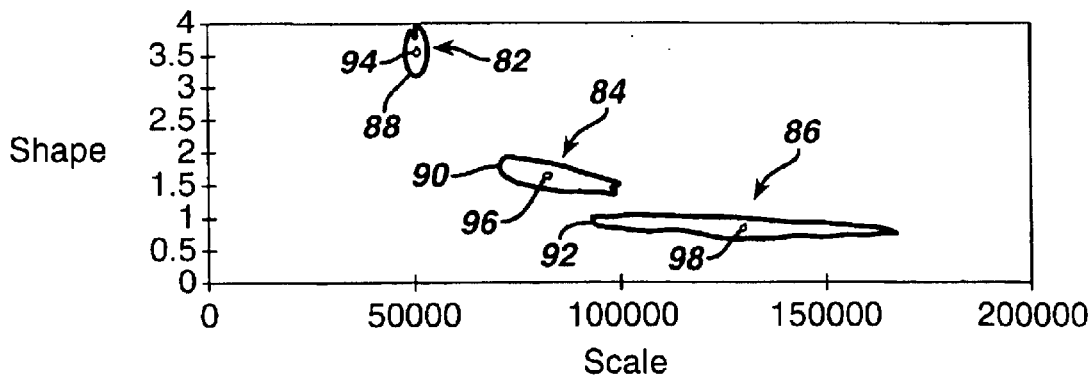

RELIABILITY ASSESSMENT METHOD, APPARATUS AND SYSTEM FOR QUALITY CONTROL

BACKGROUND OF THE INVENTION

The present invention is directed to component and system reliability and more particularly, a method, apparatus and system to generate accurate and low variance reliability estimates in order to enable timely logistical positioning of products in a delivery cue and also to conduct efficient programs of predictive maintenance.

The reliability of components and systems of components is a crucial factor in business operations and such reliability is on a critical path for most hardware product businesses. Therefore accurate and low variance reliability estimates are useful to enable the timely logistical positioning of products within a delivery cue and to also conduct efficient programs of predictive, periodic and preventative maintenance.

There has been a significant amount of work and study directed to component and system reliability assessment analysis, with regard to such components or systems at a single location. Many organizations have compiled large amounts of data regarding the components and system of components which they sell. This data is useful in connection with reliability assessment analysis processes. However, a problem exists for organizations which are geographically dispersed or segmented according to functions performed. Such organizations will commonly store any reliability data and/or ancillary data directed to components or systems of components manufactured, configured or assembled at a specific site on a database located at that same geographic location. Alternatively, one business area of an organization, such as a shipping department, may keep data it has accumulated on databases distinct from databases used by another area of a business, such as the manufacturing department. While information stored on these distinct databases may include useful reliability and/or ancillary data, it is often not obtainable by others within the organization at a separate geographic location or in a separate department. Further, in situations where the data is located on multiple databases of the organization, when the data on a first one of the databases is updated, the updated data is not automatically reflected on other databases of the organization. This results in inconsistent and/or expired data on the remaining databases.

Therefore, while organizations have expended effort to acquire valuable, relevant and reliable data, much of this data is partitioned off from many potential users within the organization. This means a reliability assessment analysis for a component or system of components may not have all the useful and up-to-date data existing within the organization. Thus, organizations are now performing sub-optimal analysis not because information has not been collected, but rather because existing data generated by the organization itself is not being used in the analysis either due to the user's lack of knowledge as to the existence of the data or the inability to obtain the data.

There is therefore a need to eliminate the partitioning of data within an organization and to provide this data to users to perform reliability assessment analysis to reliably predict expected lifetimes and remaining lifetimes of individual components and systems of components. Such an apparatus, method and system would desirably be actively changing, i.e. not static, where it is updated and continually refined by experiential data. It should also be endowed with a suitable input/output interface that allows data to be entered either automatically or by human hand, enables real time analysis of the data and provides the means to communicate the desired results in a variety of formats including graphical outputs.

BRIEF SUMMARY OF THE INVENTION

In an embodiment of the present invention, a reliability assessment analysis system is provided to weigh, winnow and incorporate into a database capability new experiential data on component and system lifetimes and also on important ancillary, data including environmental factors, logistical incidents and practices. This database capability is then made accessible through an extant communications infrastructure by analysis stations that are similarly dispersed geographically or on the basis of business area.

BRIEF DESCRIPTION OF THE DRAWINGS

FIG. 5 is a schematic block diagram of a mechanism to obtain data used in the system of the present invention;

FIGS. 6–10 depict graphical outputs generated in accordance with various reliability assessment analysis processes available through use of the present invention;

DETAILED DESCRIPTION OF INVENTION

Figure 1:
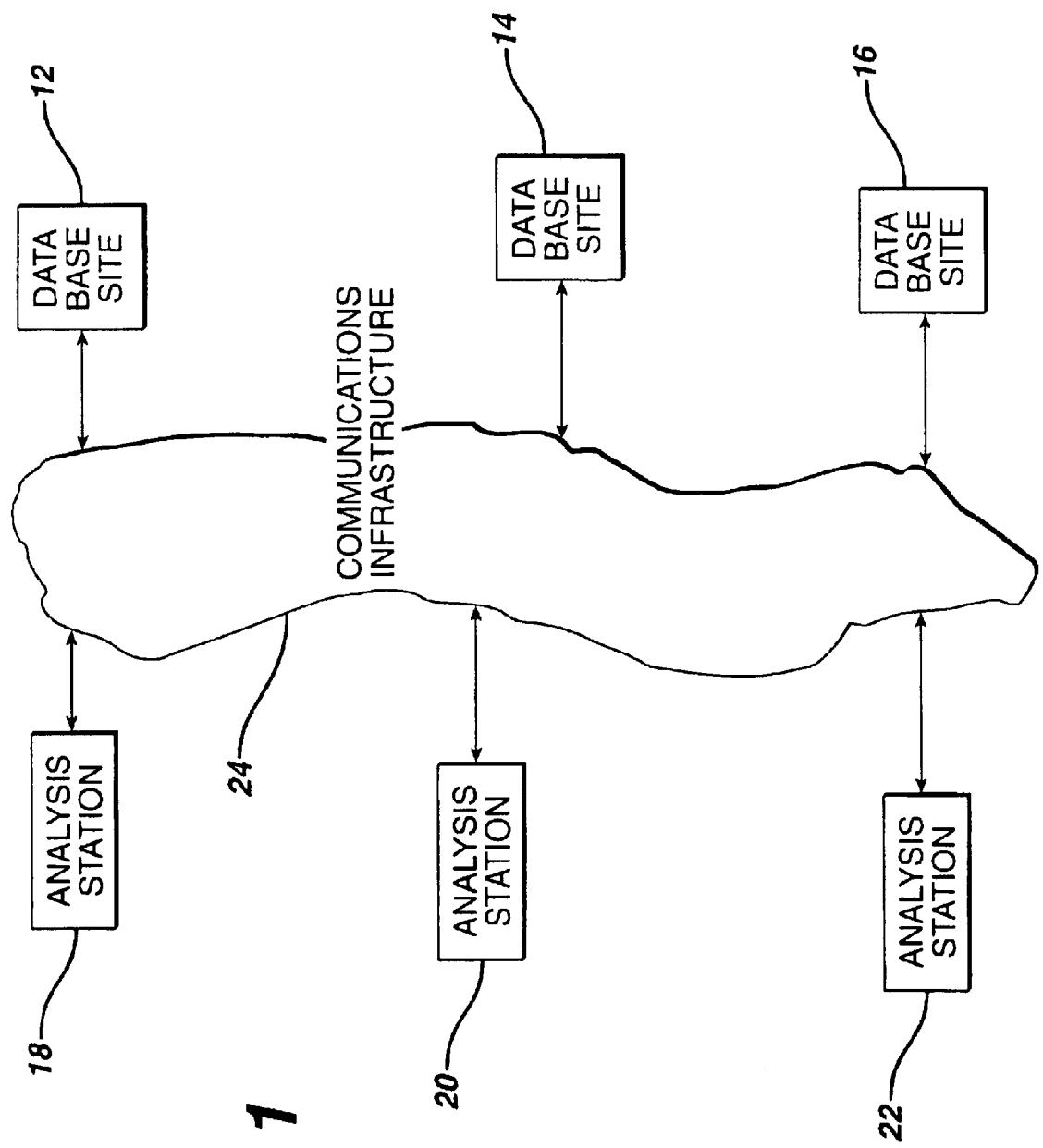
FIG. 1 depicts an overview of the reliability assessment system according to the present invention.

FIG. 1 sets forth an overview of reliability assessment system 10 according to the concepts of the present invention. System 10 includes a plurality of database sites 12–16, a plurality of analysis stations 18–22, and a communications infrastructure 24. Database sites 12–16 may communicate amongst each other or with any of analysis stations 18–22 through communications infrastructure 24. Similarly, each of analysis stations 18–22 may communicate with any of the other analysis stations 18–22 as well as any of databases 12–16, through communications infrastructure 24. The communications infrastructure 24 may be any one or a combination of private data networks, the public telephone network (PSTN), satellite networks, the Internet, or any other known or future-developed communications network.

A concept of the present invention rests on a premise that as new experiential data on component and/or system lifetimes is produced, and important ancillary data, to such as environmental factors, logistical incidents and practices, is gathered, this information may be weighed, winnowed and incorporated into a database capability. It is further understood that this data is distributed or replicated over a dispersed geographical area. This database capability may then be accessed via communications infrastructure 24 by geographically dispersed analysis stations 18–22.

Figure 2:
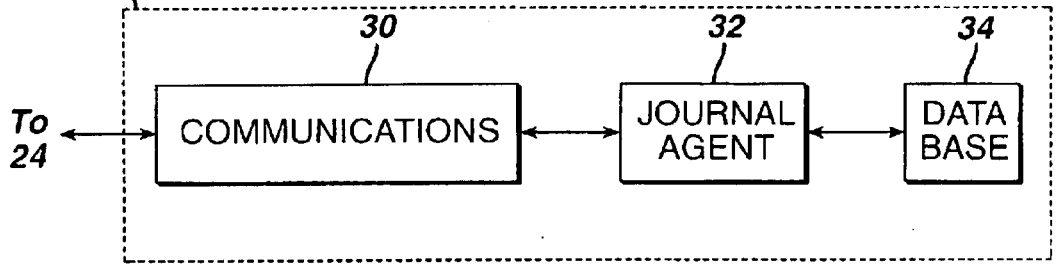
FIG. 2 provides a more detailed view of the database sites used in the system of the present invention.

Turning to FIG. 2, it is illustrated that each database site 12–16 consist of at least three main modules including, communications module 30, journal agent module 32, and database module 34. Using these modules, each database site 12–16 is configured to perform at least three particular functions. The first function includes receiving new data, archiving the new data, and updating the database in accordance with the newly received data. A second function includes creating and automatically issuing messages to other databases 12–16 through communications infrastructure 24 to promote consistency and concurrency between all the replicated and distributed database sites. The third function automatically creates and issues messages to the analysis stations 18–22 for service needed for itself or for other database sites as perceived to be required to carry out its consistency and concurrency tasks.

Communications module 30, is a bi-directional interface, which means it has the capability to send and receive functions, instructions and other data to and from communications infrastructure 24. The communications module 30 implements the communication protocol of system 10 which includes, but is not limited to, keeping track of message number continuity and message integrity including authentication and encryption where appropriate.

Database module 34, of database sites 12–16, possesses a read/write memory sufficiently sized to store the data used within the present invention. Database module 34 is also provided with a database language which allows for access, retrieval and storage operations to be performed on the data.

Journal agent module 32 functions as an intelligent interface between communication module 30 and database 34. Journal agent module 32 checks for and ensures consistency and continuity of database entries and updates. The journal agent module 32 is configured to originate messages to other databases, as well as responding to messages sent from other database sites of system 10, in order to promote consistency and concurrency between all distributed database sites 12–16. Consistency and concurrency is achieved by updating databases storing data which has been altered due to changes to the component or system represented by the data, environmental changes, or the results of a reliability assessment analysis. This updating process may be achieved by several updating techniques including data replication.

Analysis stations 18–22 function to conduct reliability analysis operations. To accomplish this task, analysis stations 18–22 are provided with appropriately stored software, which queries the replicated and distributed database sites 12–16 for specific data that is required to perform a specific reliability assessment analysis on a specific component or system of components. The results of the reliability assessment analysis are output in a user understandable format.

Figure 3:
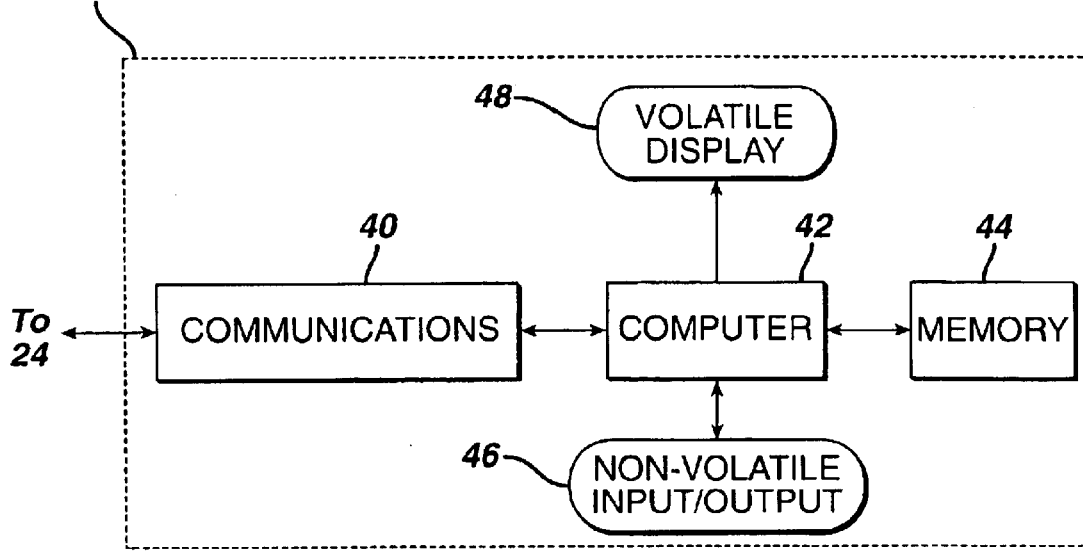
FIG. 3 is an illustration of analysis stations used in the system of the present invention.

FIG. 3 depicts one embodiment for the structure of each analysis station 18–22, which include a communications module 40, a computer or processor 42, a memory 44, a non-volatile input/output device 46, and a volatile display 48.

Communications module 40 is a bidirectional interface, such that it includes the capability of sending and receiving functions, instructions, and other data to the communications infrastructure 24. The communications module 40 implements a communication protocol which includes, but is not limited to, maintaining track of message number continuity and message integrity including authentication and encryption where appropriate. The computer or processor 42 may be a personal computer, mainframe or specifically configured micro-processor based device. Memory 44 is sufficiently sized to maintain data required for operation of stations 18–22 and is capable of keeping in a local cache, data imported from any one of database sites 12–16. The non-volatile input/output device 46 is a display output device such as a printer, and the volatile display 46 may be a display screen such as a CRT, LCD or other electronic device capable of displaying graphical and textual information.

With further attention to the journal agent module 32, when a journaling operation is undertaken, the present invention functions to ensure that each of the databases 34 of database sites 12–16 have the same generation of data. To accomplish the foregoing, journal agent module 32 generates and responds to messages in such a manner so as to promote consistency and concurrency between all the replicated and distributed database sites. In this way, database sites do not fall out of sync with each other, and therefore all users of the database sites will have the same generation of data, when the data is located at more than a single database site 12–16. This addresses a problem of co-existing inconsistent information which can occur in systems having distributed databases.

Analysis stations 18–22 are the tools which perform the appropriate reliability assessment analysis of a component or system of components. Each analysis station 18–22 will have appropriately stored analysis software for the specific type of analysis it is to undertake. Such analysis software for existing reliability assessment analysis is well known and available, and may be beneficially used in the present invention.

In operation, the user—operating one of the analysis stations 18–22—selects the appropriate software from a menu or by some other selection technique in order to perform a specific analysis operation. The analysis station 18–22 then sends a message or messages to all or a sub-group of the existing database sites 12–16, which have been data synchronized, requesting from those database sites data necessary to perform the analysis process. The analysis station 18–22 will by this method, retrieve the data it needs to perform its operations. Analysis stations 18–22 are, therefore, performing a data-mining operation from a set of database sites within an organization. It is to be appreciated that analysis stations may perform different types of reliability assessment analysis testing (i.e. one reliability assessment analysis tool may perform testing on airplane engines, another on light bulbs, and still another on computer chips.

Each analysis station 18–22 is capable of retrieving data from database sites containing relevant data. Thus, analysis stations 18–22 are the locations where the actual operation for reliability assessment analysis is performed, however the stations 18–22 are capable of using data from a variety of dispersed geographical database sites within the organization. This data is constantly being updated or synchronized to be the most accurate information capable of being supplied for the analysis operation.

The analysis stations and database sites of reliability assessment system 10 rely on similar protocols of operation. Particularly, there are two levels of protocol, the first being a protocol to interact with communication infrastructure 24, which may be an internet-type protocol, and a second protocol which is the database operation protocol. The database protocol will include an assurance that data released to an analysis station or other database site is from a synchronized database.

It is also possible with the present invention to perform a reliability assessment analysis, wherein an analysis station may need to retrieve data from more than a single database site. In this situation specific pieces of data may be found to exist on more than a single database. A concern with such overlapping data would be which is the most recent data. In the present invention the issue of overlapping data is addressed by the replication and/or synchronization techniques which are known in the art and may be built up from environments, such as from multi-processor networks.

It is to be understood that the described structure brings together previously partitioned organizational data, for use with reliability assessment analysis operations. Access to the previously partitioned data enhances known analysis techniques providing new connections between data not previously considered together, which leads to improved and potentially new reliability assessment analysis tools.

Figure 4:
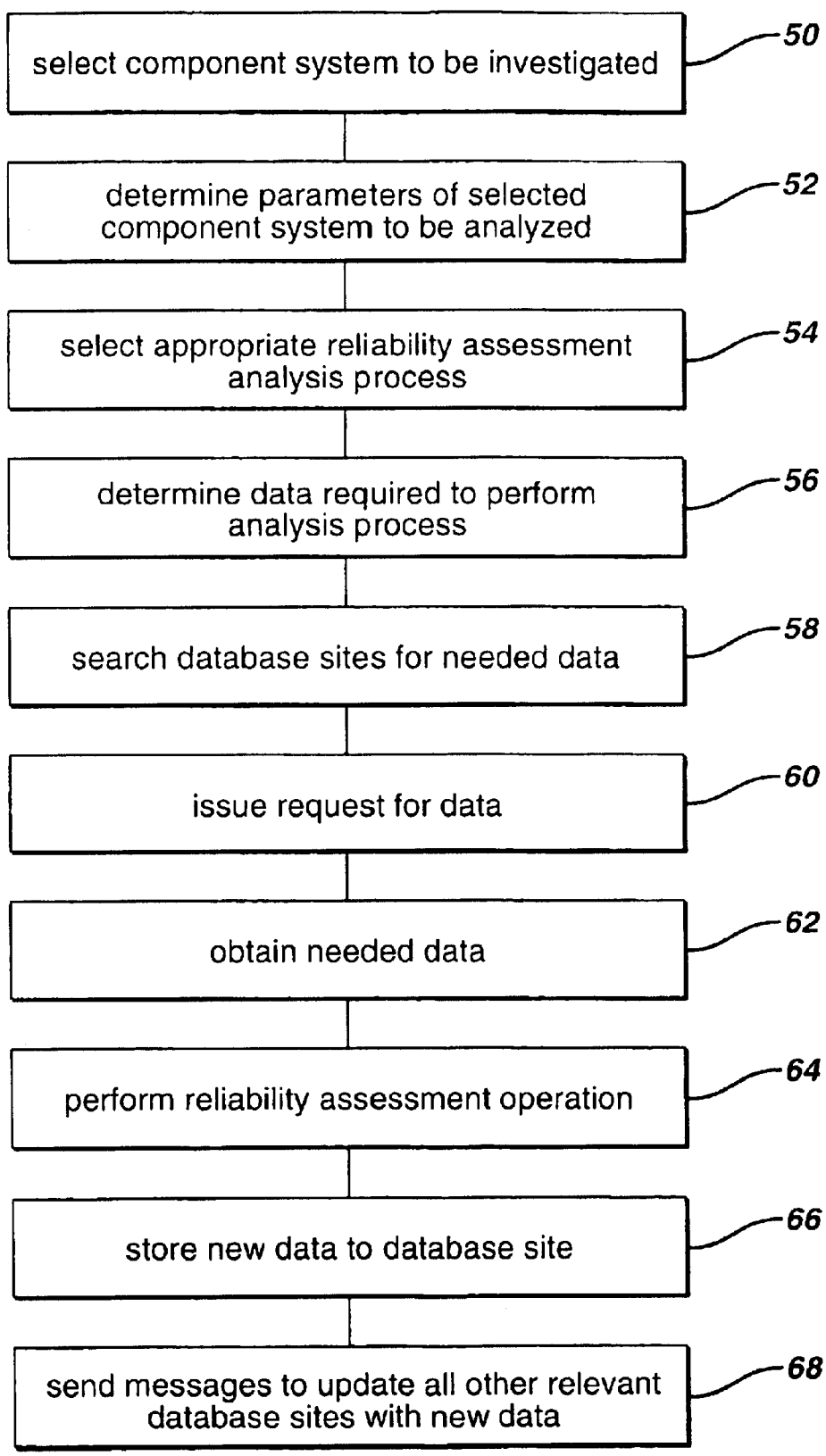
FIG. 4 is an operational flow chart for the performance of reliability assessment analysis processes.

Turning to a more detailed review of the operational flow for the present invention, attention is directed to FIG. 4. As an initial step, a user selects a component or system of components to be investigated 50. Next, the parameters of the selected component system to be analyzed are determined 52. Specifically, a component or system may be investigated for reliability in accordance with a variety of features. For example, reliability under extreme temperature conditions may be desired to be understood, or reliability, defined as life expectancy during continuous operation, may be investigated. Numerous parameters and combination of parameters and definitions of reliability are available for analysis.

Once it has been determined which component or system is to be tested, and the parameters of that testing are selected by a user, an appropriate reliability assessment analysis tool is selected 54. Such a tool is commonly formed as software operating on one of the analysis stations. The testing art has a variety of analysis tools which may be implemented with the present invention.

Next, a determination is made as to what data is required to perform the analysis operation 56. The analysis station operating the reliability analysis tool will then investigate or search the database sites within the organization to determine which databases contain the required data 58. The analysis station then issues requests for the needed data to the databases determined to be holding the data 60, and obtains the determined data from the databases carrying the needed data 62. Once the data has been obtained, the selected reliability assessment analysis operation is undertaken 64. Following completion of the reliability analysis operation of step 64, when updated data regarding the component or system is obtained due to execution of the operation, the analysis station supplies the new data to the database from which the original data was retrieved, whereby the database archives the data and updates the database accordingly 66. That database site then creates and automatically issues messages to the other databases in the organization's system, via the communications infrastructure, to promote consistency and concurrency between the distributed database sites 68. The database site may also then issue messages directly to the databases to provide the new data, or create messages to the analysis station for service needed for itself or other database sites as perceived to be needed to carry out its consistency and concurrency tasks 68.

When a new reliability assessment analysis is undertaken, the database sites of the system will each have the most recent generation of data available. Further, by providing intercommunication between the dispersed database sites, a user which previously had access to a single database site containing data generated at a single location, now has access to multiple sources of existing data generated within the organization.

A specific benefit of the present invention is the potential for the development of previously unavailable reliability analysis techniques. For example, and as will be explained later in more detail, by providing access to previously partitioned unavailable data, a user developing reliability assessment analysis tools, is now able to consider various different types of data available from several distinct sources, where this different data may be mapped into a common form providing a user with another view of the reliability of the component or system.

Examples of different types of reliability assessment analysis operations which may be performed based on data gathered using the present invention, include those for a comparison of fault modes, a comparison and determination of costs of failures and risks, a determination of stability and entitlement, a quantification of Six Sigma reliability, a comparison of different products and of products produced on different production lines, a testing to see whether a process change has demonstrated a statistically significant change in the response or reliability, a comparison of call center rates, a demonstration of non-homogeneity of distribution, and a robust mixture of reliability metrics and responses (e.g. time and cycles, scans, or rotations).

An example of a mechanism used to gather data for the reliability assessment analysis, is a mechanism designed to gather ancillary environmental data. A diagram showing this mechanism is illustrated in FIG. 5. Data gathering system 70 gathers environmental data related to shipping containers. Special shipping container (SSC) 72, includes sensors 74 which sense for various environmental conditions such as acceleration, humidity, specific corrosive agents, temperature and pressure, among others. Controller 76 is provided for proper sequencing of operations of the system. Communication is achieved via a plurality of data ports 78 on both SSC 72 and controller 76, for receiving programming data and outputting data stored in a memory 80.

Data collected by system 70 may be physically found at an associated analysis station, whereas other data may be stored at dispersed database sites, such as database sites 12–16 of system 10. Once this data has been obtained by an analysis station, it can be used in a reliability assessment analysis process. Thus, FIG. 5 illustrates a specific data gathering procedure to generate data which may be used with the present invention.

Turning now to FIGS. 6–10 depicted are graphical outputs generated in accordance with various reliability assessment analysis processes which have obtained data through the use of the present invention. The outputs may be displayed to a user either through use of the non-volatile input/output 46 or volatile display 48.

FIG. 6 sets forth a three-dimensional representation of component reliability for three separate sub-systems SI, S2 and S3. This particular analysis output is directed to the medical field and compares the number of scans on an x-ray tube (20,000, 40,000, 60,000 scans) versus a probability of sub-system survival from 0–1. As can be seen, for S1 the probability of survival goes down dramatically between 20,000 scans and 60,000 scans, whereas the drop-off for sub-systems S2 and S3 are not as dramatic. The three-dimensional visualization of component survival changes over time, with respect to various components of the system provides a system developer with an easily interpretable tool to identify where the vulnerability of the overall system exists.

Turning to FIG. 7, shown is a contour plot graph (with a Weibull Shape & Scale) which is a technique to show reliability on a two-parameter scale, including a shape parameter (y-axis) and a scale parameter (x-axis). The shape parameter indicates whether the failure rate is increasing, decreasing or remaining constant over time. The scale parameter (also referred to as the characteristic life parameter) is the point in time at which 63.2% of the population is projected to fail. Graphically representing data based on scale and shape parameters are concepts known within the testing/reliability art.

In FIG. 7 each contour plot 82, 84, 86 includes a center point 88, 90, 92 indicating a best estimate of what the two parameters (shape, scale) are for the component or system being analyzed. Also part of the contour plot is the outer contour 94, 96, 98 around center point 88, 90, 92. The outer contour reflects a level of confidence in the center point estimate, based on the sample size used during the reliability assessment analysis. When there is a large amount of sample data, the outer contour is smaller (for example outer contour 94), than an outer contour generated using less sample data (for example contour 98). When contour plots overlap, it indicates that there is no statistical difference between the two corresponding sets of data. A no overlap situation is understood to mean there is a statistical difference between the data.

Additionally, contours may line up with the same shape but at different scales. A graphical representation of this type indicates that the components represented by the contours may have the same failure modes, but outside factors may be influencing the failure rate. This situation may be seen, for example, in connection with two identical train locomotives operating over different terrains. If the first locomotive operates on a hilly terrain it may experience a different failure rate than the second locomotive operating on flat terrain. The contour plot for these locomotives would be represented by two contours with the same shape values but with different scale values, where the higher failure rate representation is for the locomotive used on the hilly terrain and the lower failure rate would be reflected for the locomotive operating on the flat terrain.

Figure 8:
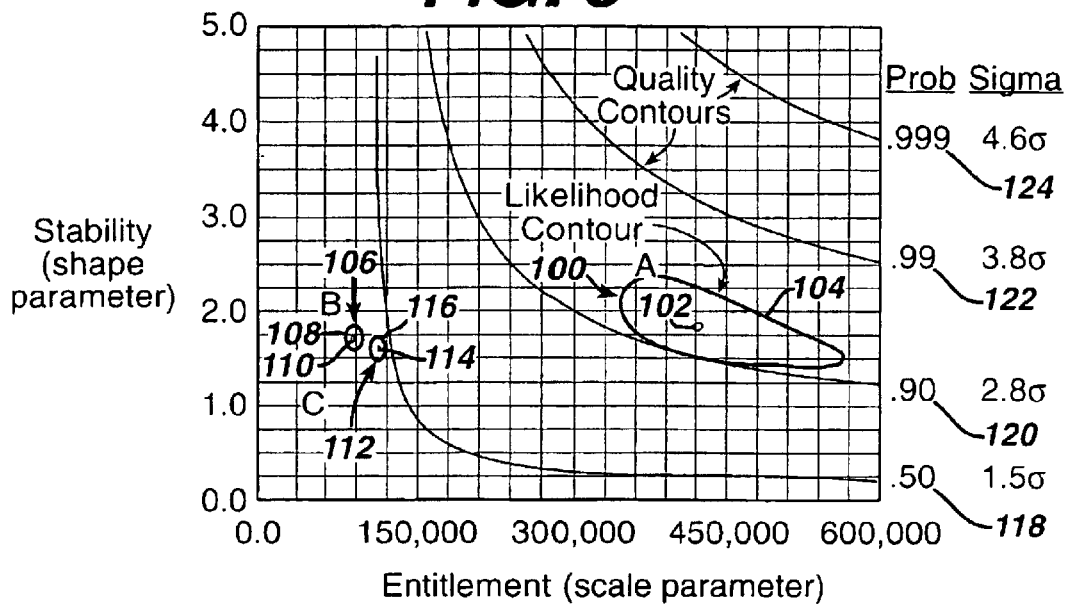

Turning to FIG. 8, shown is an entitlement graph, which places contour plots in relationship to reliability curves. The data used to generate the entitlement graph being obtained through the use of the concepts of the present invention. Looking at contour plot A 100, the center point 102 represents the best estimate of the shape and scale of the failure of a first component or system. And the width of the outer contour 104 around center point 102 represents a confidence level of the center point 102 based on the data sample size used. Viewing contour plot A 100 and contour plot B 106, it can be seen, as reflected by outer contour 108, that there is a greater confidence as to the center point 110 of contour plot B, compared to center point 102 of contour plot A 100. A possible reason for this result is that the component or system corresponding to contour plot A 100 may be a newer product than the component or system corresponding to contour plot B 106. Therefore, the outer contour 104 of contour plot A 100 is formed based on a smaller data sample size than the outer contour 108 of contour plot 106. Similar concepts exist for contour plot C 112, with center point 114 and outer contour 116.

With attention to the quality contour lines (0.50, 0.90, 0.99, 0.999) 118, 120, 122, 124 on the graph of FIG. 8, these represent shape and scale values which translate to a level of quality. Therefore, if for example, someone is interested in the probability of a component surviving "x" hours of operation, the 0.90 line 120 represents shape and scale values which translate into that level of quality with a 90% level of confidence. More specifically, the 0.90 line 120 represents a 90% confidence that a particular component will survive some predetermined number of hours of operation. Any contour plot above the 0.90 line 120, up toward the right-hand corner would have a greater than 90% confidence of surviving the predetermined number of hours of operation. By generating contour plots for certain components of the system and producing corresponding reliability curves, it is possible to see which components are causing more problems from a reliability standpoint. This permits a user to improve those components and therefore improve the overall system operation.

It is also shown in FIG. 8, that the probability values (0.50, 0.90, 0.99, 0.999) may also be translated into Six Sigma terminology. FIG. 8 illustrates where there are early life failures that can be quite disastrous, while over time provides a tool to determine where defect variability occurs in order that they may be eliminated. On the stability axis, going from 0.0 towards 5.0 represents moving from a lower stability state to a more stable state. If a defect is at 1.0, this indicates there is a constant failure rate over time. Below 1.0 is an indication that there are early life failures that can be quite disastrous. Also shown is that over time the deficiencies or defects decrease. For manufacturing it is desirable to be far above 1.0, which indicates that the component is a wear-out mechanism. Furthermore, the higher the value the smaller the variance, indicating that when the component does wear out, it is likely such components are wearing out at similar points in time and therefore there is a very low variation in failure time.

The entitlement scale provides a graphical view of the average life for a component or a system of components. Ideally, it would be desirable to have a high-shape parameter and a high-scale parameter so that there is low variability in the failure time.

The variance-based representations may be then translated to the natural parameters, i.e. the scale parameters and shape parameters on the distributions. This information is then used to determine reliability, using variability metrics that are of concern during the development of products, in order to visualize how those products are being used out in the field. The translation from probability values to Six Sigma is a straightforward translation. The mapping is a direct one-to-one non-linear relationship, which is known in the art.

Figure 9:
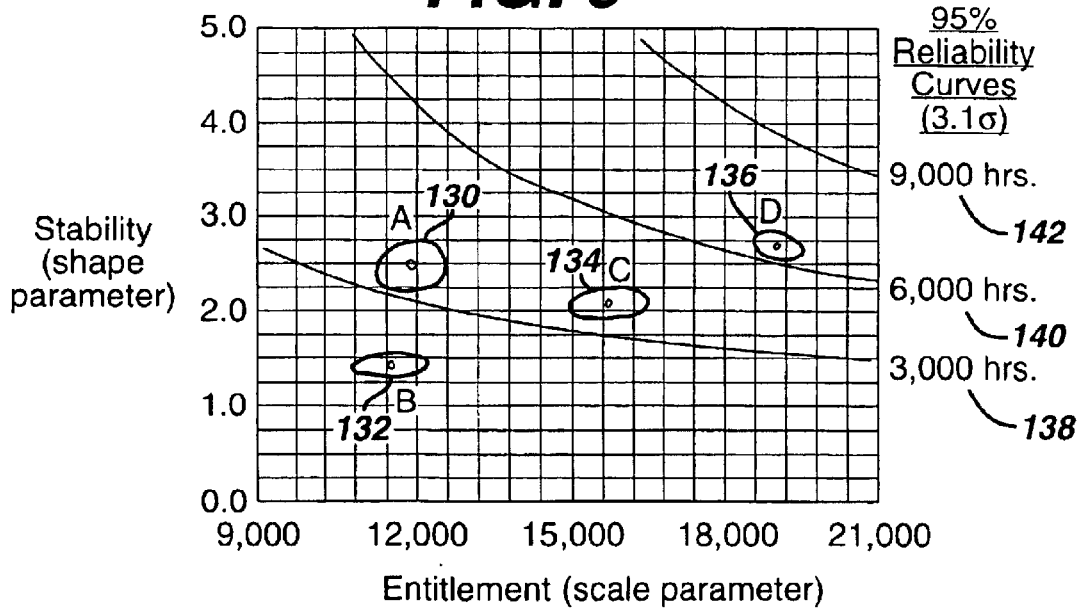

Turning to FIG. 9, shown is another graphical output obtainable through use of the present invention. In addition to contour plots A 130, B 132, C 134, and D 136, a number of the reliability curves 138, 140, 142 reflect a desired 95% (3.1 sigma) confidence level of component survival at different hours of operation, i.e. 3,000, 6,000, 9,000. As depicted, the component represented by contour plot B 132 fails to meet the 95% confidence level at all hours of investigation. Looking at the 6,000 hours reliability curve 140, contour plots A 130 and C 134 also do not meet the 95% criteria, however contour plot D 136 does meet the criteria. Moving to the 9,000 hours reliability curve 142 it can be seen none of the contour plots meet the desired 95% confidence level.

The reliability curves such as the 6,000 hour line may be found by the formula:

$$R(6,000) = \exp[-(6,000/\text{scale parameter})]^{\text{shape parameter}}$$

which represents a probability survival line for components at 6,000 hours. Components which are above the line going towards the upper right-hand corner of the graph will tend to survive at 6,000 hours, whereas those below the line would tend not to. It is to be appreciated that an infinite number of such lines can be drawn for different survival hours. Thus, the formula provides the probability of a component surviving for "x" hours given specific scale parameters and shape parameters. Therefore there is an infinite number of shape and scale values that will all provide the same value and that is what is represented by the reliability curves shown.

It is noted that the contour plots represent component reliability. This is especially relevant when speaking of warranties. Generation of highly reliable output charts enables an organization to determine which components or systems will not meet a specified warranty. For example, a user of this system 10 would not provide a warranty for a component represented by contour plot B 132 for 3,000 hours, however the user may be willing to provide a warranty for components represented by contour plots A, C and D. Since the provision of warranties represents a significant financial risk, it is extremely valuable to have a high level of accuracy in the prediction of when a component or system will fail. The concepts of the present invention are beneficial in this regard since it provides a user with increased resources from which to obtain data, a mechanism to increase the reliability of the obtained data and a method and apparatus for accurately analyzing this data.

Figure 10:
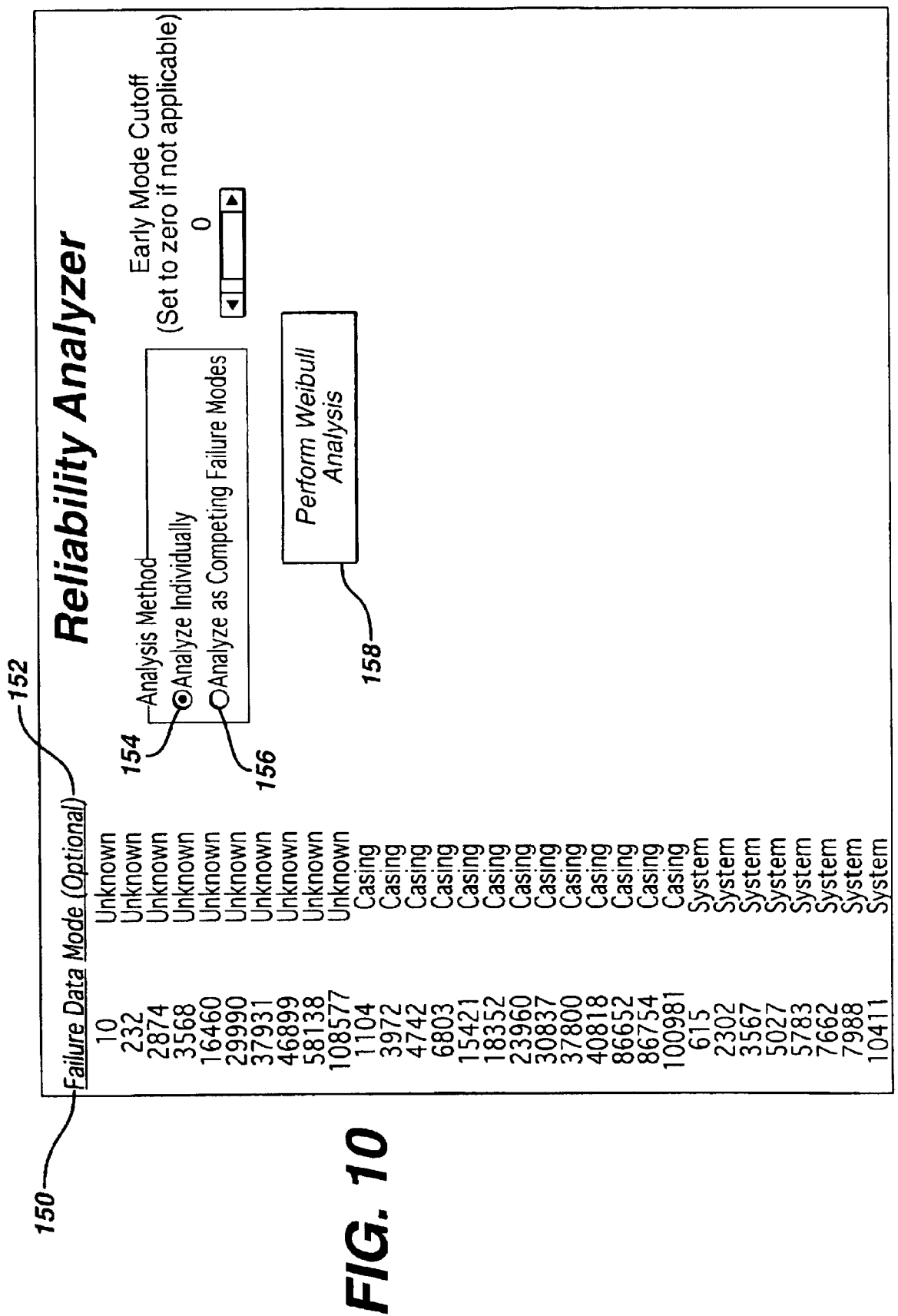

FIG. 10 depicts an output screen where acquired failure data 150 and the failure modes 152 are listed. In this example, there are "Unknown", "Casing" and "System" failure modes. The analysis method may be selected as being an individual analysis mode 154, or an analysis of competing failure modes 156. When the "Perform Weibull Analysis" 158 is selected, probability charts such as shown in the previous figures are generated using the acquired failure data.

It is noted that both the center points and the outer contours of the contour plots are derived statistically. The center points and contours may be determined by the well known method of Maximum Likelihood.

An aspect of the present invention again worth noting is that the data used in the various reliability assessment analysis processes, was created by the organization. Therefore data can be relied upon by a user as being accurate and/or relevant to the analysis operations to be undertaken. In one respect, the present invention provides a data mining feature, where large amounts of previously accumulated organizational data, can be located by a user. Further, when data is located on different databases, all the data is updated such that the most current data is available even if that new data is generated at a remote source from the original source.

For example, it is first assumed that a reliability assessment analysis has been undertaken at location L1, at a time T1 for component C1. Thereafter reliability analysis for component C1 is undertaken at time T2 at Location L2. Once the newly updated or additional information regarding the reliability of this component has been obtained, the database at Location L1 is not only updated but the newly provided information is supplied to any database having similar data regarding the component C1 such as the database in Location L1. Using this process data within an organization is maintained current and available irrespective of where in the organization the newly generated information is derived.

Thus, the present invention provides for the use of data obtained from separate sources in a manner not previously possible. An example of the foregoing may be seen in connection with data obtained while a component is being shipped. Such shipping data may include the ambient temperature, humidity or other information obtained during the shipping process. This data may then be compared or correlated to failure data for the component. These individually obtained pieces of data can then be collected for a number of similar components. Using reliability analysis results, a criterion can then be developed to reject a component or components based on the data obtained during the shipping process (i.e. the shipping data). For example, it may be found that components shipped above a certain temperature correlate to an unacceptable failure rate. Thus, present invention provides a manner of consolidating previously partitioned data, which leads to new analytical techniques for reliability assessment analysis, not previously available.

Figure 11:
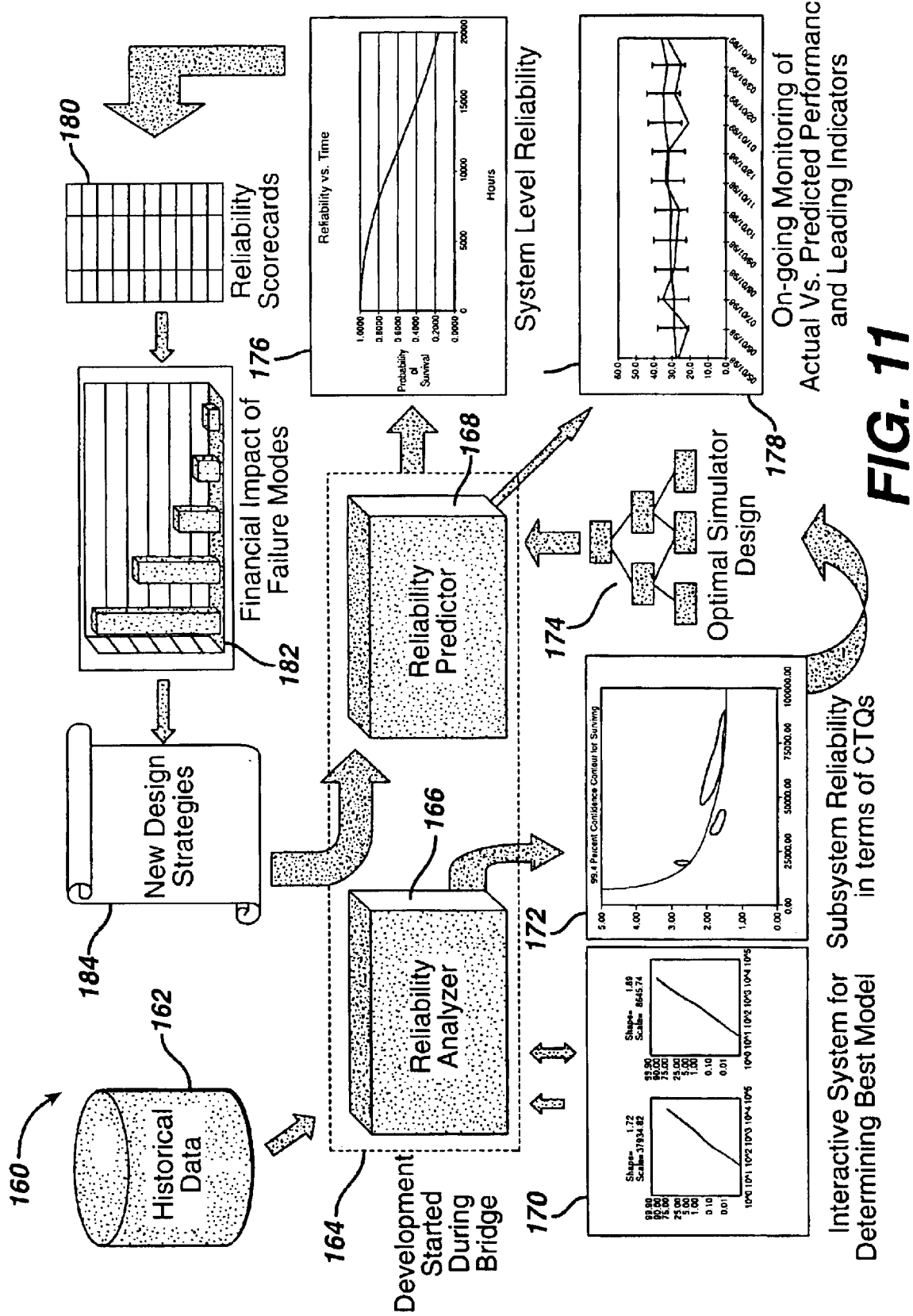
FIG. 11 illustrates an integrated reliability assessment tool components of which are found within the present invention.

Turning to FIG. 11, illustrated is an integrated reliability assessment tool 160, parts of which may be used within the system of the present invention. The flow of FIG. 11 includes obtaining historical data 162 from a variety of sources, which are provided to a reliability work station 164 including a reliability analyzer 166 and a reliability predictor 168. The reliability analyzer 166 interacts with interactive system 170 to determine a best analysis model to be used for the reliability assessment analysis of reliability analyzer 166. Output from reliability analyzer 166 represents subsystem (or component) reliability and may be illustrated by a reliability output 172 in any of a variety of formats. The analysis results represented by reliability output 172 is used to generate an optimal simulator design 174, which generates an optimization of the subsystem under analysis. This optimized subsystem information is then used by reliability predictor 168 of workstation 164. Reliability predictor 168 generates a system level reliability output 176 and an ongoing monitoring of actual versus predicted performance and leading indicators 178.

Based on the analysis input, the foregoing outputs indicate what will be the projected actions or occurrences which will happen over time in terms of ongoing monitoring processes. Therefore, tool 160 initially looks at the individual subsystems (i.e. components) such as through subsystem reliability 172, and then tool 160 looks at what will be the system level reliability 176 and the ongoing monitoring of actual versus predicted performance and leading indicators 178.

The system level reliability 176 is used to generate certain reliability scorecards 180 which are developed in accordance with standards set by an organization. Particularly, reliability scorecards are operating standards of components and/or systems which are deemed acceptable to an organization. These standards can be reliability factors as to component life, failures and software operation, or other measurable standards.

Reliability scorecards are also used in determining a financial impact due to failure modes of components or systems 182. The financial impact of failure modes is useful in highlighting the impact particular components or systems have on financial terms. For example, reliability scorecards may provide an alternative view between a commonly occurring error, which has a minor financial impact versus an infrequent error which would have a disastrous financial impact. Using this information an organization can make decisions of where to place its resources to improve operation having the most financial impact. Next, new design strategies 184 are developed and fed back into the reliability predictor module 168. This is therefore an ongoing process to improve the analysis and outputs. The workstation 164 may be considered part of the analysis engine of FIG. 1.

Figure 12:
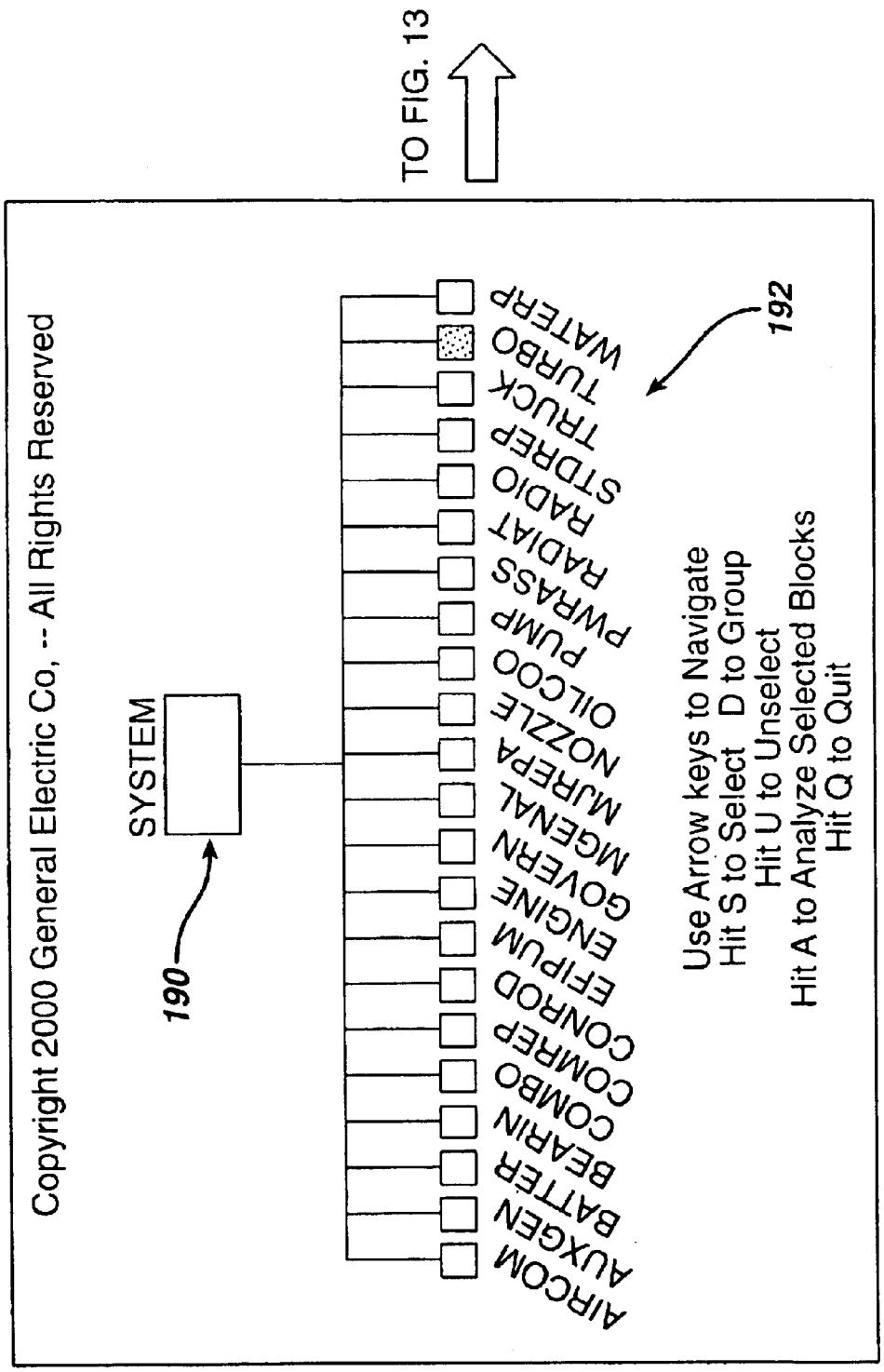
FIGS. 12–17 provide an illustration of the operation of software for reliability assessment analysis in accordance with the present invention.
Figure 13:
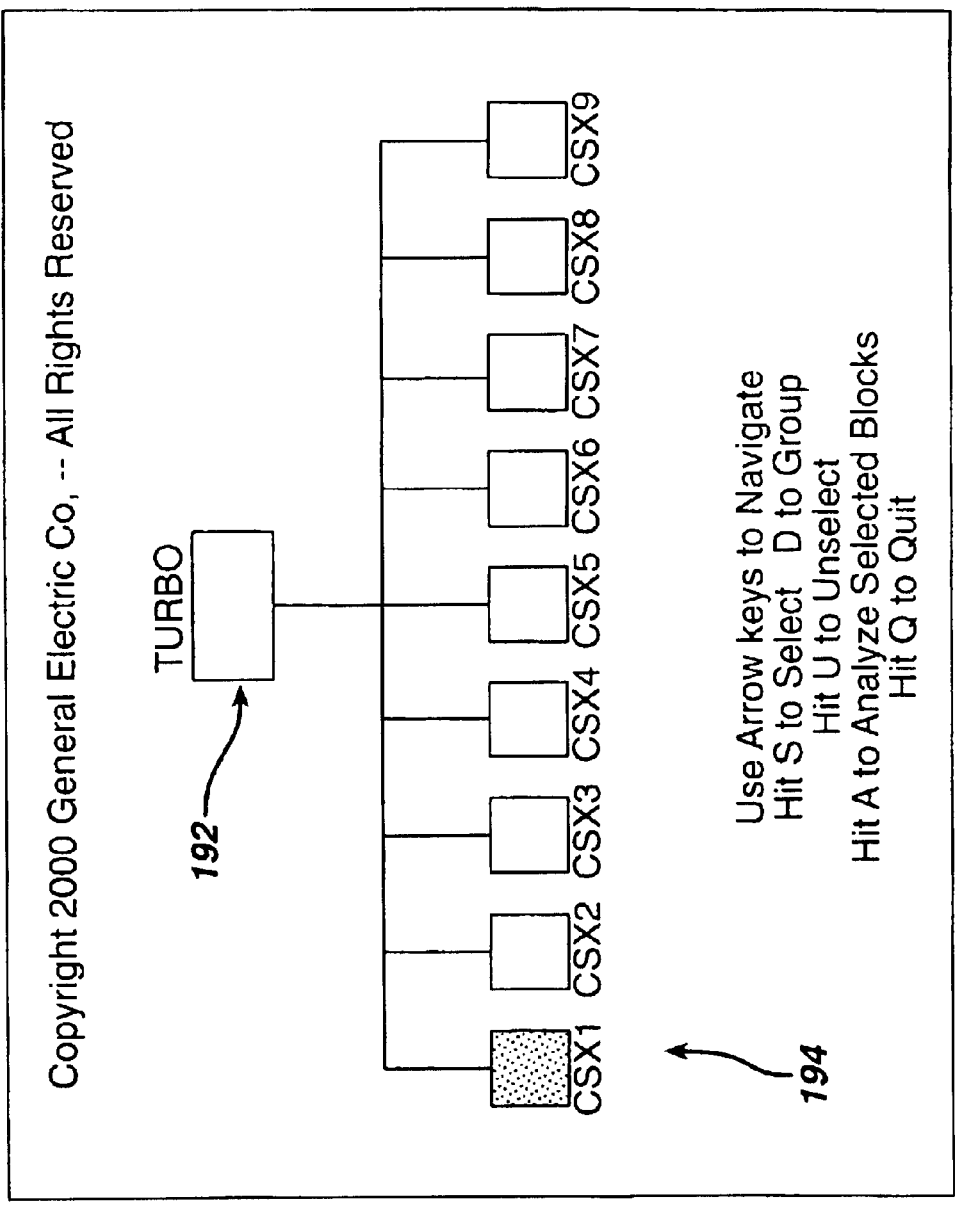
Figure 14:
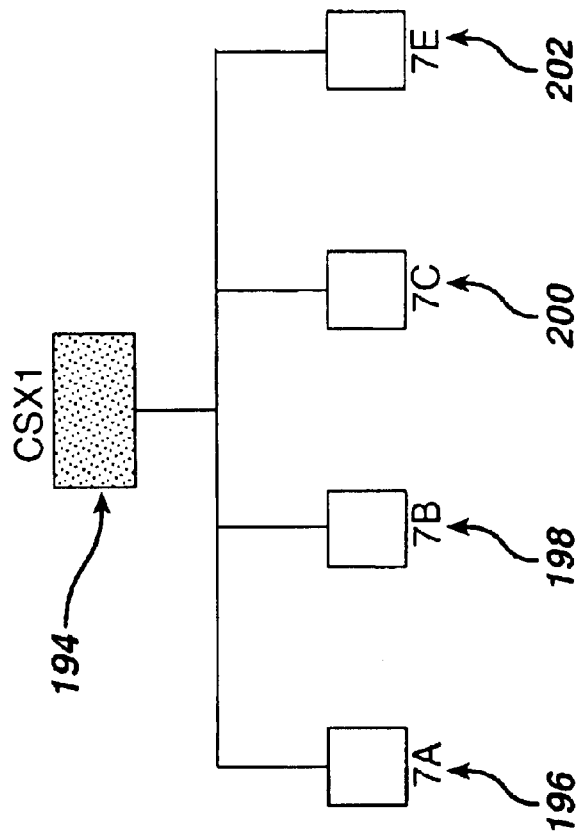

An example of output screens illustrating the operation of reliability assessment analysis software with the present invention is depicted by FIGS. 12–17. This software allows the user to graphically explore data concerning a system in a hierarchical manner. FIG. 12 sets forth the highest level view of a system 190 under investigation, including major subsystems which comprise system 190. If the user highlights and selects a major subsystem (TURBO) 192, a FIG. 13 will appear on the screen display. FIG. 13 provides a more detailed view of the selected major subsystem 192, showing nine subsystems which make up major subsystem 192. When the user highlights and selects a subsystem, such as subsystem CSX1 194, a screen displaying graphics such as depicted in FIG. 14 appears, providing a detailed view of the CSX1 subsystem 194 showing four sub-subsystems (7A, 7B, 7C, 7E) 196–202.

Figure 15:
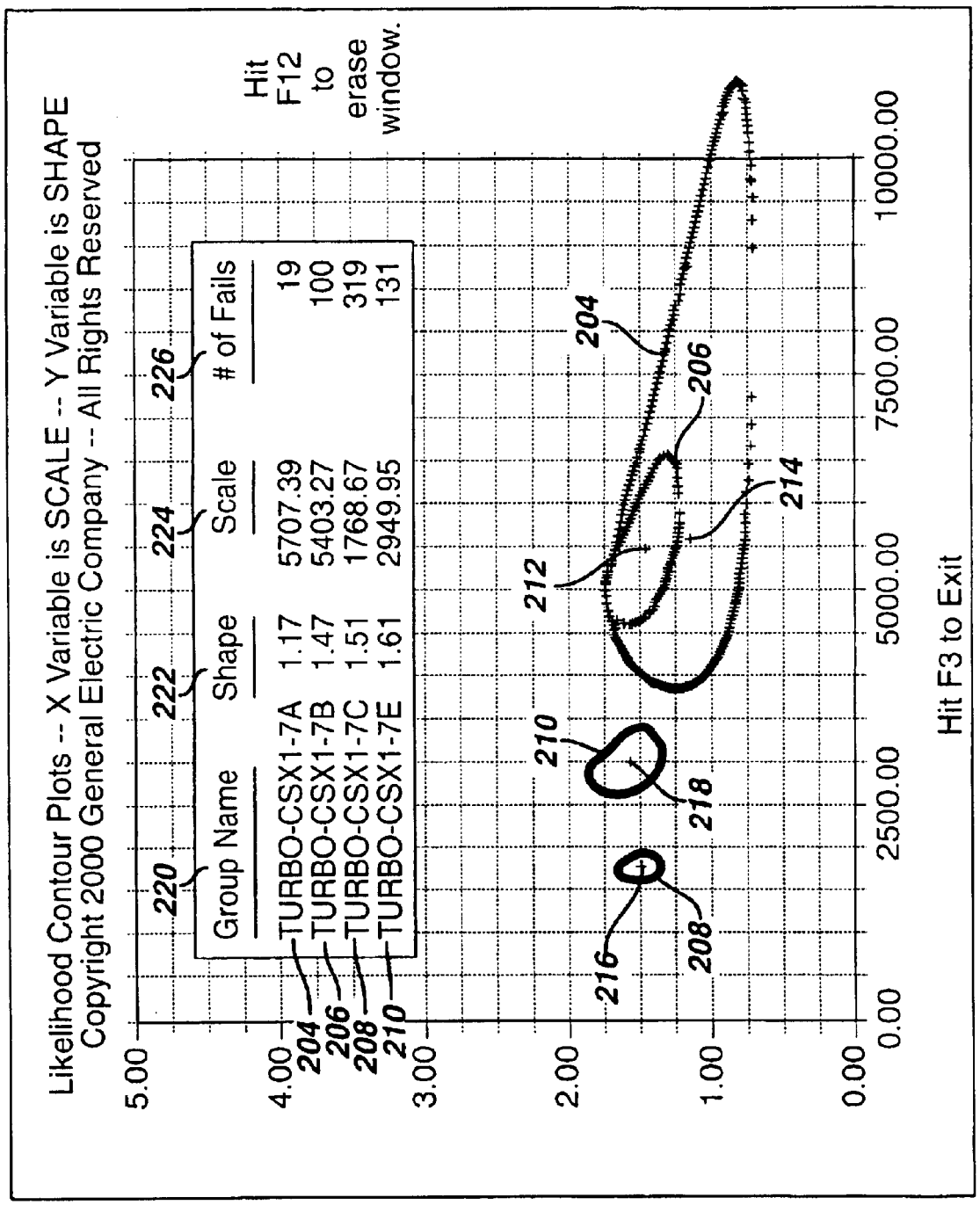

When the user highlights and selects each of sub-subsystems 196–202, a reliability analysis process is initiated and performed, using a Weibull distribution, on the data associated with this level of system 190. Results of that analysis are then displayed, as shown in FIG. 15. Four contours 204–210 are, respectively, displayed for each of the four sub-subsystems 196–202 of FIG. 14.

While in this example all four subsystems 196–202 are selected and analyzed, less than all sub-systems at a level of system 190 could be selected and analyzed. Additionally, while the reliability analysis process employed in this embodiment is Weibull distribution analysis, other known analysis techniques may also be used.

The x and y axes in FIG. 15 are values of Scale and Shape parameters, respectively, associated with the Weibull distribution. The center points 212–218 of each contour 204–210 represent a Maximum Likelihood estimate for the data. Each contour 204–210 represents a 90% confidence region for these Shape and Scale parameter estimates based on the uncertainty associated with the data under investigation.

FIG. 15 also displays a table listing the component being analyzed (Group Name) 220 the values of the Shape and Scale parameters 222, 224 along with the number of failures 226 associated with each sub-subsystem under investigation.

Figure 16:
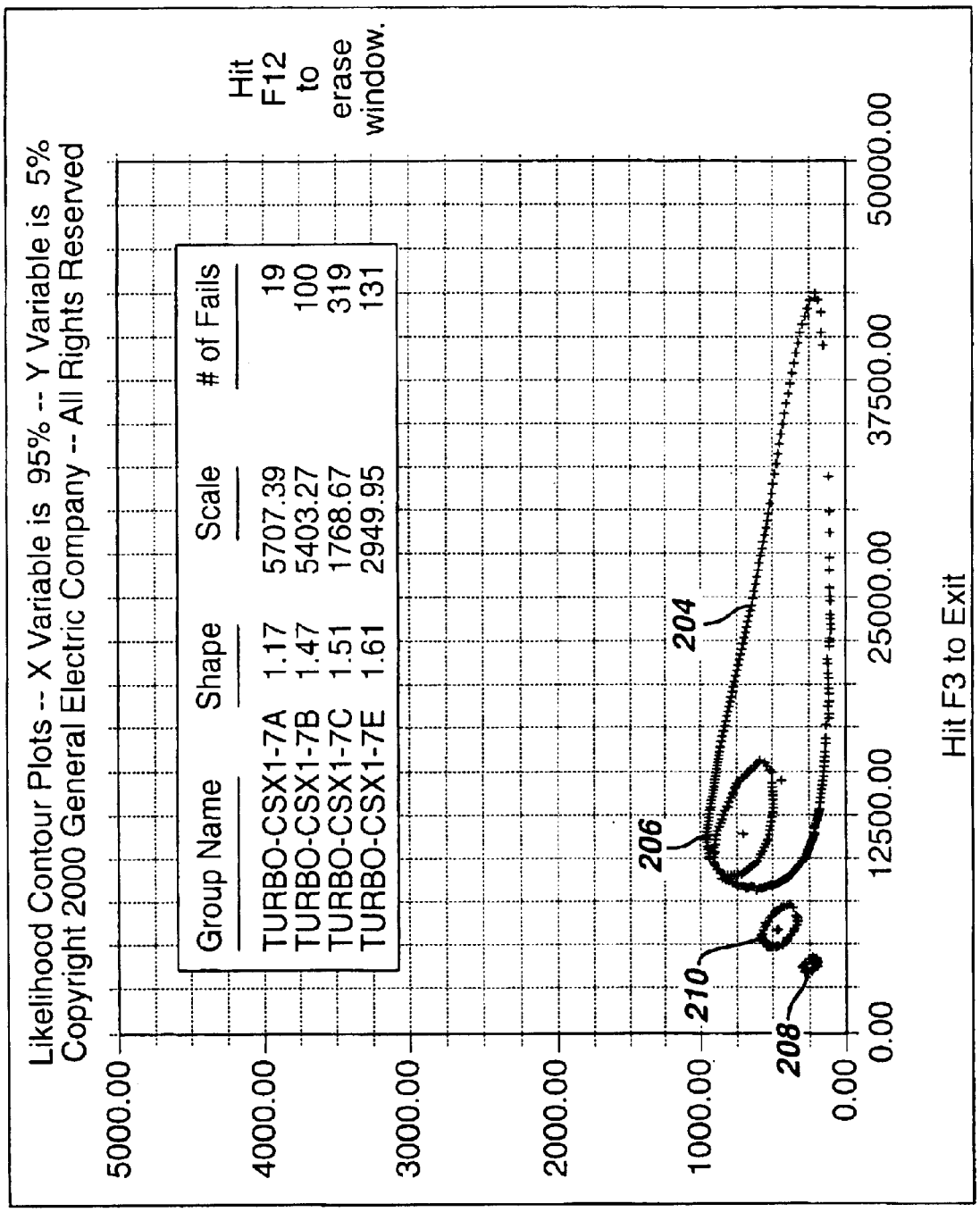

FIG. 16 illustrates the same data displayed in FIG. 15, except the axes have been transformed. Specifically, the y and x axes are now the values of time associated with the 95% probability of failure and 5% probability of failure (commonly referred to as the P95 and P05 values), respectively. Any such transformation of the axes can be performed (e.g. by first and third quartile, mean and standard deviation, etc.) as desired to gain more insight into the reliability performance.

Figure 17:
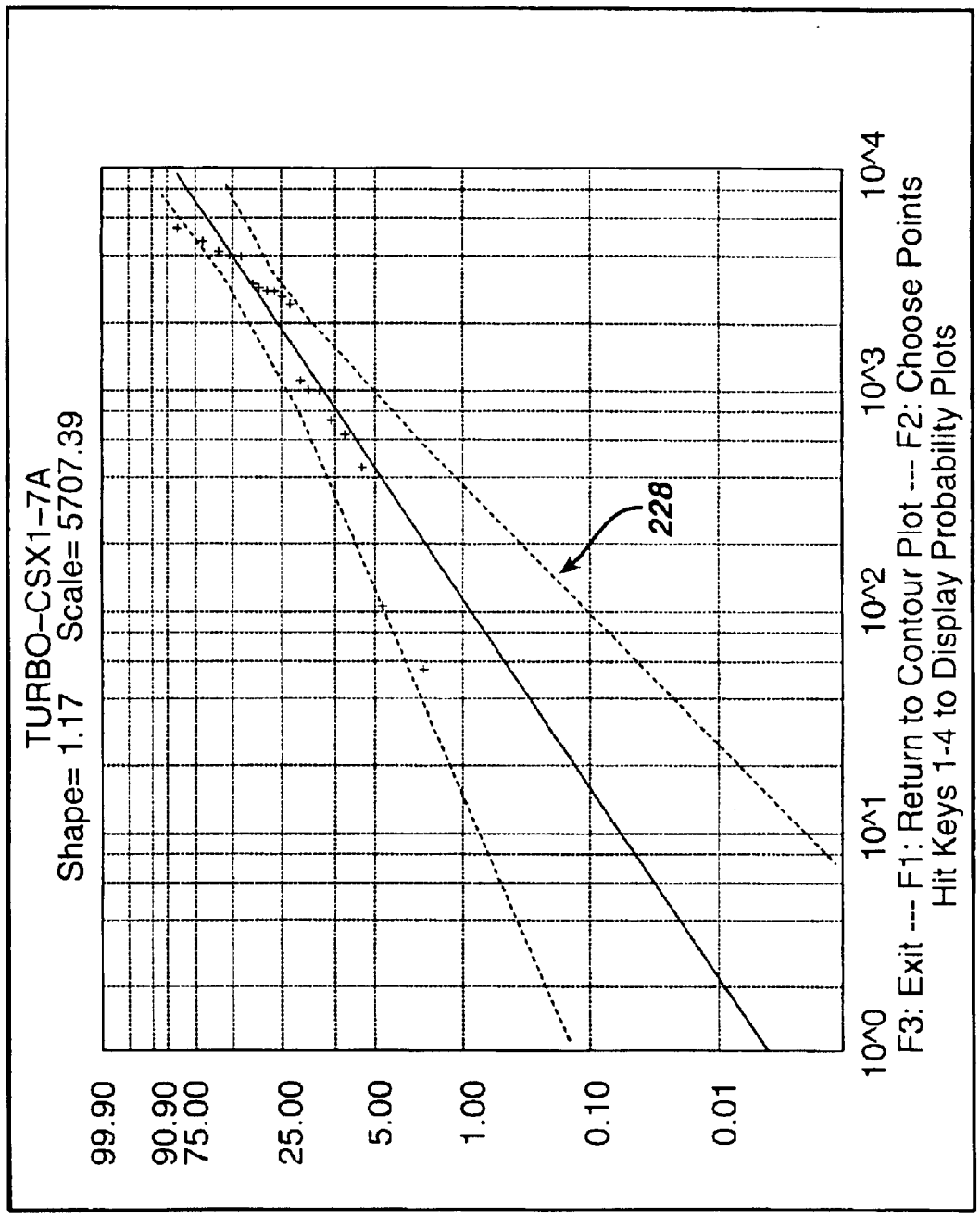

Finally, FIG. 17 shows a Weibull probability plot 228 of the data for subsubsystem (TURBO-CSX1-7A) 196. It should also be noted that the analysis performed on sub-subsystems 196–202 can, in this embodiment, be performed on any level of a system simply by highlighting and selecting the respective point in the hierarchy and initiating the reliability analysis. In this way, the user can explore graphically and statistically various levels of a system under investigation.

From the foregoing, one aspect of the present invention is found in the collection of the various elements into a common system used to perform reliability analysis in a highly accurate manner. The disclosed infrastructure describes a system that allows for the high reliability assessment analysis processes.

It is to be understood that a single analysis station, when it is performing its analysis function can potentially select data from a number of databases (e.g. database A, database B . . . database N). If the system uses, but does not alter the data, updating of the databases is not necessary. However, if during the reliability analysis process data is changed, the data will be updated not only in the database from which the data was pulled, but messages will be sent out to any location where that data is stored in order to update the data to the most recent generation.

Again, therefore, an aspect of system 10, is the ability to go back to databases within the organization and update data, or at least note that an update needs to be made, regarding changes to a database.

The present system may be developed as software which automatically updates databases as changes are made. It may also fill in databases as the new design strategies are developed. It is to be noted that the present invention is directed to predictive maintenance as opposed to periodic maintenance. An organization, as described therein includes public, private and non-profit corporations, partnerships, universities, research laboratories, as well as other organizations which have accumulated and stored data at different distinct locations.

While the invention has been described with respect to specific embodiments by way of illustration, many modifications and changes will occur to those skilled in the art. It is therefore, to be understood that the appended claims are intended to cover all such modifications and changes as fall within the true spirit and scope of the invention.

Having thus described the invention, it is claimed:

1. A reliability assessment analysis system for use within an organization to perform analysis on at least one of components and systems of components, the system comprising:

a plurality of analysis stations, at least one analysis station being at a remote location from other ones of the analysis stations, each one of the analysis stations being capable of performing reliability assessment analysis processes on components or systems of components;

a plurality of database sites, at least one of the database sites located at a remote location from other ones of the database sites, each database site including a database of data, at least some of the data useable by at least one of the analysis stations; and a communications infrastructure providing a communication path between and among the plurality of analysis stations and the plurality of database sites, wherein the analysis stations and database sites are configured to provide a user of at least one of the analysis stations with access to more than a single one of the database sites, and wherein the analysis stations and database sites are further configured to update data stored on the database sites when new data is obtained; and wherein each of the database sites include,
 a communications module configured as a bi-directional interface to send and receive functions between the communications infrastructure;
 a database, sized to store data used by the system, and a database language to operate the database; and
 a journal agent module configured as an intelligent interface between the communications module and the database, wherein the journal agent module is configured to check for and ensure consistency and continuity of database entries and updates, and to respond to messages to other database sites in order to promote consistency and concurrence between all the database sites.

2. The system according to claim 1 wherein each of the analysis stations include,
   a communications module configured as a bi-directional interface to send and receive functions between the communications infrastructure;
   a processor configured to control operation of the reliability assessment analysis processes;
   a memory configured to store data regarding at least one of components and systems of components being analyzed;
   a non-volatile input/output device connected to provide an interface between the analysis stations and users of the system; and
   a volatile display output device configured to output results of the reliability assessment analysis.

3. The system according to claim 1 wherein the communications infrastructure is at least one of a private data network, a public telephone network, a satellite network and the internet.

4. The system according to claim 1 wherein the system is active and is updated and refined by experiential data.

5. The system according to claim 4 wherein the experiential data is generated within the organization.

6. A reliability assessment method comprising the steps of:
   determining a component or system of components to be investigated;
   selecting a reliability assessment process to perform on the selected component or system of components;
   determining data needed to perform the selected reliability assessment process;
   searching to find which of a plurality of databases within an organization contain the data needed to perform the reliability assessment process;
   requesting the needed data from at least one of the databases containing the needed data;
   obtaining the needed data by an analysis station by which the reliability assessment analysis is to be performed;
   performing the reliability assessment analysis on the component or system of components using the obtained data;
   generating an output representing the results of the reliability assessment analysis, wherein the output representing the results of the reliability assessment analysis comprises graphical representations updating the database from which the needed data was obtained; and
   updating all other databases in the organization which also contain the needed data.

7. The method according to claim 6 wherein the step of updating the database from which the needed data was obtained includes, sending the new data to the database, archiving the new data, and updating the database in accordance with the archived data.

8. The method according to claim 7 further including, by at least one of the database sites the step of:
   creating and automatically issuing messages to other database sites in the organization through a communications infrastructure to promote consistency and concurrency between all database sites within the organization.

9. The method according to claim 8 further including, by at least one of the database sites, the step of:
   creating and automatically issuing messages to the analysis stations for service for at least itself and for other database sites perceived as being needed to carry out consistency and concurrency tasks.

10. The method according to claim 9 wherein the consistency and concurrency tasks include performing data replication processes.

11. The method according to claim 6 wherein data within an organization are un-partitioned and made available to a user of an analysis station.

12. The method according to claim 6 wherein the needed data for operation of the reliability assessment analysis is found at more than a single database site.

13. A reliability assessment analysis system for use within an organization to perform analysis on at least one of components and systems of components, the system comprising:
   a plurality of analysis stations, each station including,
      a communications module configured as a bidirectional interface to send and receive functions between the communications infrastructure,
      a processor configured to control operation of the reliability assessment analysis processes,
      a memory configured to store data regarding at least one of components and systems of components being analyzed,
      a non-volatile input/output device connected to provide an interface between the analysis stations and users of the system, and
      a volatile display output device configured to output results of the reliability assessment analysis, wherein the output results of the reliability assessment analysis comprise graphical representations,
   at least one analysis station, being at a remote location from other ones of the analysis stations, each one of the analysis stations being capable of performing reliability assessment analysis processes on components or systems of components;
   a plurality of database sites, each site including,
      a communications module configured as a bidirectional interface to send and receive functions between the communications infrastructure,
      a database using software to control operation of the database, and
      a journal agent module configured as an intelligent interface between the communications module and the database,
   at least one of the database sites located at a remote location from other ones of the database sites, each database site including a database of data, at least some of the data useable by at least one of the analysis stations; and
      a communications infrastructure providing a communication path between and among the plurality of analysis stations and the plurality of database sites,
   wherein the analysis stations, and database sites are configured to provide a user of at least one of the analysis stations with access to more than a single one of the database sites, and wherein the analysis stations and database sites are further configured to update data stored on the database sites when new data is obtained.

14. A method of performing a hierarchical reliability assessment analysis on data off a system, the method comprising the steps of:
   determining a system of components to be investigated;
   selecting a reliability assessment analysis to perform on the selected system of components;
   determining data needed to perform the selected reliability assessment analysis;

searching to find which of a plurality of databases within an organization contain the data needed to perform the reliability assessment analysis;

requesting the needed data from at least one of the databases containing the needed data;

obtaining the needed data by an analysis station by which the reliability assessment analysis is to be performed;

displaying on a display screen a graphical representation of the system and of first subsystems of the system;

selecting at least one of the first subsystems;

initiating reliability assessment analysis of data for the selected first subsystems;

displaying results of the reliability assessment analysis;

updating the database from which the needed data was obtained; and updating all other databases in the organization which also contain the needed data.

15. The method according to claim 14, wherein the reliability assessment analysis uses a Weibull distribution analysis.

16. The method according to claim 14 wherein the step of displaying the results of the reliability assessment analysis include, displaying a contour plot including a plurality of contours, each contour having a center point representing a Maximum Likelihood estimate of level of confidence in the center point estimate.

17. An apparatus of performing a hierarchical reliability assessment analysis on data off a system, comprising:

a determining means for determining a system of components to be investigated;

a selecting means for selecting a reliability assessment analysis to perform on the selected system of components;

a data determining means for determining data needed to perform the selected reliability assessment analysis;

a searching means for searching to find which of a plurality of databases within an organization contain the data needed to perform the reliability assessment analysis;

a requesting means for requesting the needed data from at least one of the databases containing the needed data;

an obtaining means for obtaining the needed data by an analysis station by which the reliability assessment analysis is to be performed;

a displaying means for displaying on a display screen a graphical representation of the system and of first subsystems of the system;

a selecting means for selecting at least some of the first subsystems;

an initiating means for initiating reliability assessment analysis of data for the selected first subsystems;

a display means for displaying results of the reliability assessment analysis;

an updating means for updating the database from which the needed data was obtained; and an updating means for updating all other databases in the organization which also contain the needed data.

* * * * *

UNITED STATES PATENT AND TRADEMARK OFFICE
CERTIFICATE OF CORRECTION

PATENT NO. : 6,738,931 B1
DATED : May 18, 2004
INVENTOR(S) : Brock E. Osborn et al.

It is certified that error appears in the above-identified patent and that said Letters Patent is hereby corrected as shown below:

Column 13,
Line 47, please delete "comprises graphical representations updating the data-" and insert -- comprises graphical representations; updating the data- --. therefor.

Signed and Sealed this

Tenth Day of August, 2004

JON W. DUDAS
*Acting Director of the United States Patent and Trademark Office*